United States Patent
Smith et al.

(10) Patent No.: US 7,250,860 B2
(45) Date of Patent: Jul. 31, 2007

(54) METHOD AND INTEGRATED SYSTEM FOR NETWORKED CONTROL OF AN ENVIRONMENT OF A MOBILE OBJECT

(75) Inventors: Brian J. Smith, Aliso Viejo, CA (US); Eric Schafer, Carlsbad, CA (US)

(73) Assignee: Signature Control Systems, Inc., Irvine, CA (US)

( * ) Notice: Subject to any disclaimer, the term of this patent is extended or adjusted under 35 U.S.C. 154(b) by 344 days.

(21) Appl. No.: 10/952,821

(22) Filed: Sep. 30, 2004

(65) Prior Publication Data

US 2006/0084420 A1    Apr. 20, 2006

(51) Int. Cl.
*G08B 1/08*    (2006.01)

(52) U.S. Cl. .............. 340/539.22; 340/539.1; 340/539.13; 340/825.49; 340/825.69; 340/988; 340/989; 701/208; 701/213

(58) Field of Classification Search ........... 340/539.22, 340/539.1, 539.13, 539.19, 988, 989, 426.19, 340/426.22, 825.49, 825.69; 701/36, 208, 701/211, 213
See application file for complete search history.

(56) References Cited

U.S. PATENT DOCUMENTS

| | | | |
|---|---|---|---|
| 4,983,980 A | | 1/1991 | Ando |
| 5,225,842 A | | 7/1993 | Brown et al. |
| 5,544,225 A | * | 8/1996 | Kennedy et al. .......... 455/412.1 |
| 5,610,815 A | | 3/1997 | Gudat et al. |
| RE35,498 E | | 4/1997 | Barnard |
| 5,673,305 A | | 9/1997 | Ross |
| 5,724,243 A | * | 3/1998 | Westerlage et al. ...... 455/456.5 |
| 6,211,818 B1 | | 4/2001 | Zach, Sr. |
| 6,317,058 B1 | | 11/2001 | Lemelson et al. |
| 6,339,745 B1 | | 1/2002 | Novik |
| 6,611,755 B1 | | 8/2003 | Coffee et al. |
| 6,847,892 B2 | * | 1/2005 | Zhou et al. .................. 701/213 |

* cited by examiner

*Primary Examiner*—Hung Nguyen
(74) *Attorney, Agent, or Firm*—Posz Law Group, PLC (57) ABSTRACT

A controller (301), for example on a field interface of a resource management system (300), determines a location of a mobile object (303a, 303b, 303c) and controls an environment thereof. The controller (301) receives, via a first transceiver (307), a communication including information representative of the mobile object; receives a command via a second transceiver (317) and controls the environment outside of the mobile object responsive to the command and/or the communication. A controller, for example on the mobile object (303a, 303b, 303c), detects a location of the mobile object (303a, 303b, 303c) via device (305a, 305b, 305c). The controller collects information about the mobile object including location; transmits, to a controller via its transceiver, a communication including the information; receives a command via its transceiver; and controls operation of the mobile object responsive to the command.

22 Claims, 9 Drawing Sheets

METHOD AND INTEGRATED SYSTEM FOR NETWORKED CONTROL OF AN ENVIRONMENT OF A MOBILE OBJECT

BACKGROUND OF THE INVENTION

1. Field of the Invention

The present invention relates to devices for tracking mobile objects, and more particularly, to systems and methods for providing control of an environment of an autonomous mobile object.

2. Description of the Related Art

Today's systems for control and management of resources can provide a vast assortment of information collected in relation to any number of resources. For example, conventional vehicles can be equipped to scrutinize themselves periodically, for example in relation to maintenance programs and vehicle status. Conventional systems provide that information collected from a vehicle can include, for example, temperature, oil pressure, voltage, location, speed, distance, angle of incline, weight, etc.

As another example, global positioning system (GPS) devices can be provided built in to mobile objects, such as vehicles, so that the mobile object can be tracked and located on demand. When the operator of a vehicle equipped with GPS makes an emergency call, for example, the caller is placed in direct contact with a system that can pinpoint the location of the vehicle.

GPS based vehicle tracking systems are used in a variety of applications. A city may use it to track bus routes; car manufacturers use GPS based vehicle tracking systems to help locate stranded drivers. Generally, when a tracking system requires vehicle position data be sent to a central location during vehicle operation, some form of communication interface is present in the vehicle.

A variety of resource management systems that are useful in relation to environmental control are known. Consider, for example, irrigation systems which can be distributed over widespread areas in order to control irrigation and/or fertigation.

The use of mobile objects in particular environments can alter the environment, however momentary the change may be. Moreover, the environment can have negative effects on the mobile object and/or occupants of the mobile object.

Unfortunately, no attempt has been made to solve the problem of interaction between resources within disparate resource management systems, such as the mobile object and the environment in which it is placed. The result has been that resource management conditions can occur in a way which ignores the effect of mobile objects upon resources, such as the environment that is being managed, and the effect of the managed environment upon the mobile object.

Figure 1:
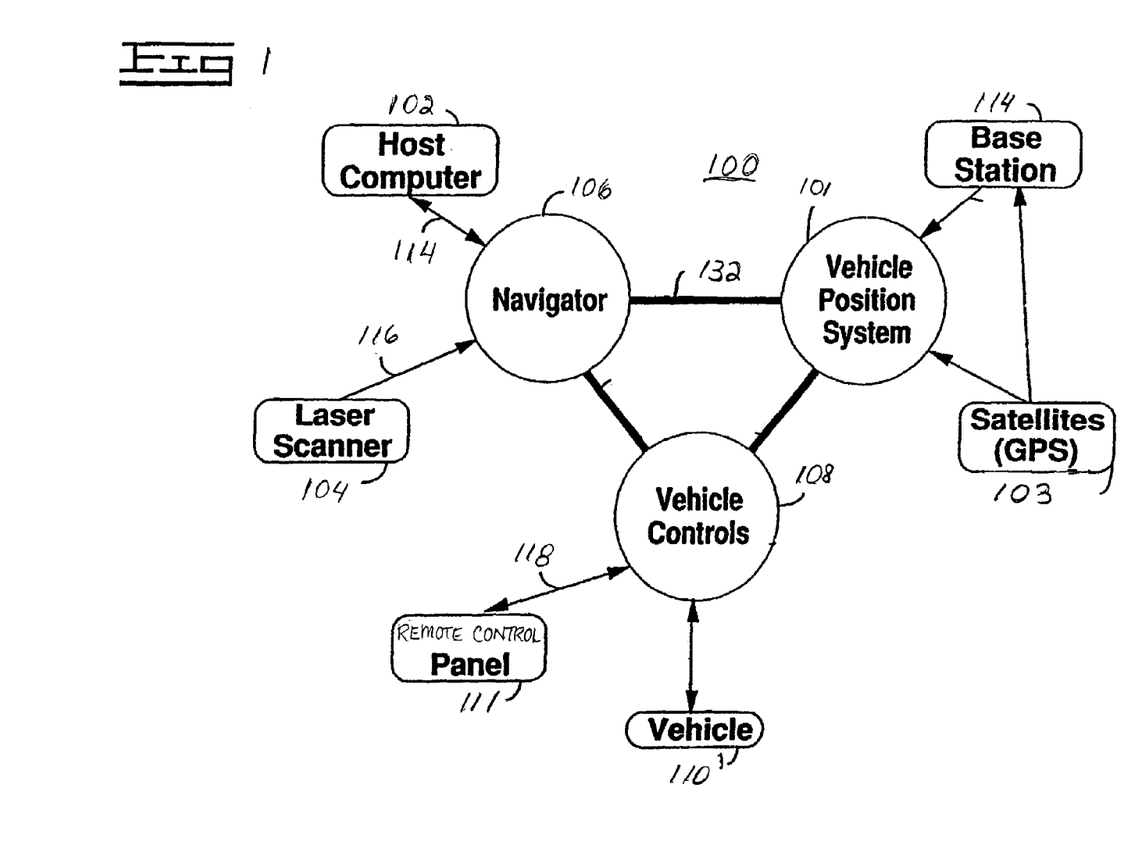
FIG. 1 is a block diagram of an example of a prior art integrated vehicle positioning and navigation system.

Some aspects of conventional systems for tracking a mobile object are illustrated by way of example in FIG. 1, also described in U.S. Pat. No. 5,610,815, Gudat et al, ("Gudat"), expressly incorporated herein by reference. The integrated vehicle positioning and navigation system according to Gudat encompasses several systems, apparatus and/or functions. A VPS (Vehicle Positioning System) 101 subsystem of the overall system 100 outputs position data that indicates where the vehicle is located. Position data output from the VPS is received by a navigator 106, which determines where the vehicle will go and how to get there, and in turn outputs data composed of steer and speed commands to a vehicle controls functional block 108 to move the vehicle. The host 102 from the base station 114 commands a vehicle 110 to take a route. The navigator 106 generates a path for the vehicle to attempt to follow. Position information 132 is derived from global positioning system satellites 103. A vehicle manager receives commands 118 from a remote control panel 111 and the navigator 106, and decides which a mode (e.g., autonomous, manual) the vehicle 110 should be in. Navigation of the vehicle 110 is obtained using the position information 132, route information 114, and obstacle detection and avoidance data 116 detected by a laser scanner 104.

The above prior art references and other conventional systems, however, fail to solve the problem of interaction between the mobile object and a resource management system in which it is placed, such as an environment. Moreover, none of these conventional systems provide for taking into consideration the mobile objects that may be located in and have an effect on other managed resources, such as an environment.

SUMMARY OF THE INVENTION

One or more embodiments can alleviate the deficiencies of conventional techniques and systems described above in the various alternate embodiments described herein. The present invention can respond to the need for providing an interaction between the mobile object and a resource management system monitoring and/or controlling the environment in which the mobile object is provided.

One or more aspects of the present invention can provide, for example, that the environmental controls take the mobile object into consideration when controlling the environment via the resource management system.

Accordingly, one or more embodiments of the present invention provide a method, system, and computer program device for determining a location of a mobile object and controlling an environment of the mobile object. A processor can communicate via first and second transceiver; can receive, from a mobile object via the first transceiver, a communication including information representative of the mobile object; can transmit, responsive to the communication, a first command to an other controller via the second transceiver; can receive a second command via the second transceiver from the other controller; and can control the environment outside of the mobile object responsive to the second command and/or the communication.

According to one or more embodiments, there are provided a first transceiver, to receive communications transmitted from the mobile object, and a second transceiver, to transmit and receive commands.

In accordance with one or more embodiments, the processor is configured to facilitate opening one or more communication channels to one or more other controllers, and can transmit the first command to the other controller(s) on the communication channel(s).

In accordance with one or more embodiments, the processor is configured to facilitate providing one or more communication channels from the first transceiver to a radio on the mobile object, and to facilitate receiving the communication on the communication channel. Optionally, the first command is initiated at the controller and indicates a location of the mobile object, a history of the mobile object, and an identity of the mobile object. According to one or more embodiments, the mobile object is a vehicle, and the history indicates information sensed regarding the status of the vehicle.

One or more embodiments provides for a memory, configured to store information representative of an environment at a location of the first transceiver, wherein the processor determines whether or not to control the environment exterior of the vehicle responsive to the information representative of the environment at the location of the first transceiver.

In accordance with one or more embodiments, the processor is configured to facilitate communicating as part of a distributed network system. One or more embodiments provide that the distributed network system is a peer-to-peer network.

In accordance with exemplary embodiments and alternative embodiments, the processor facilitates controlling irrigation.

Further, in one or more embodiments, the processor can determine and/or predict a location of the mobile object, and can transmit the first command to the other controller when a location of the mobile object will be proximate to the other controller.

The second command, according to exemplary embodiments, is one or more of: adjust irrigation operation, review irrigation operation, review environment sensors, review irrigation schedule, initiate watering, and/or disable watering.

In accordance with one or more embodiments, the processor can transmit a third command to the mobile object to control an operation of the mobile object.

One or more embodiments provide a controller for use in connection with determining a location of a mobile object, and controlling an environment of the mobile object. There is included a global positioning system (GPS), for sensing a location of the mobile object. Also included is a processor, connected to the GPS, wherein the processor is configured to facilitate communicating via a transceiver; to facilitate collecting information representative of the mobile object including at least the location; to facilitate transmitting, to a controller via the transceiver, a communication including the information representative of the mobile object; to facilitate receiving a command via the transceiver from the controller; and to facilitate controlling an operation of the mobile object responsive to the command.

In accordance with one or more embodiments, the controller is utilized in the mobile object.

The controller of claim 14, further comprising a first transceiver, wherein the processor is configured to facilitate opening one or more communication channel to the other controller, and to facilitate communicating with the controller on the communication channel. Optionally, communication channel(s) is a short wave radio channel.

The information in accordance with one or more embodiments can include a history of the mobile object from information sensed by the mobile object regarding a status of the mobile object, and an identity of the mobile object.

According to one or more embodiments, the mobile object is a vehicle, and the history indicates information sensed regarding the status of the vehicle.

In accordance with one or more embodiments, the processor further is configured to facilitate storing the collected information when outside of a communication range with the controller, and transmitting the stored information to the controller when the mobile object is within the communication range.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE SEVERAL VIEWS OF THE DRAWING(S)

The above-mentioned and other advantages and features of the present invention will be better understood from the following detailed description of the invention with reference to the accompanying drawings, in which.

DETAILED DESCRIPTION OF THE INVENTION

One or more embodiments can provide for tracking a mobile object, and controlling an environment of the mobile object, for example via a resource management system. Such resource management systems can benefit by providing site management and/or site maintenance whilst incorporating tracking and control of the mobile object. An exemplary and alternative exemplary embodiment can be utilized, for example, in connection with golf courses, parks, and the like.

The following detailed description includes many specific details. The inclusion of such details is for the purpose of illustration only and should not be understood to limit the invention. Throughout this discussion, similar elements are referred to by similar numbers in the various figures for ease of reference. In addition, features in one embodiment may be combined with features in other embodiments of the invention.

It is further understood that relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

In overview, the present disclosure discusses wireless communications devices or units, often referred to as communication units, such as cellular phone or two-way radios, pagers, walkie talkies, other wireless communication devices, and the like, that can be associated with a communication system such as an Enterprise Network, a cellular Radio Access Network, a dispatch network, unit-to-unit communications, or the like. Such communication systems may further provide services such as voice and data communications services to the communication units. The term communication unit may be used interchangeably herein with subscriber unit, wireless subscriber unit, phone, two-way radio, wireless subscriber device or the like. Each of these terms denotes a typically a wireless mobile device that may be used with a dispatch network, a public network, for example in accordance with a service agreement, unit-to-unit, or within a private network such as an enterprise network.

The communication systems and communication units of particular interest are those providing or facilitating data communications services over dispatch networks, such as talk-around dispatch systems, cellular wide area networks (WANs), such as conventional two way systems and devices, various cellular phone systems including analog and digital cellular, CDMA (code division multiple access) and variants thereof, Global System for Mobile communications (GSM), GPRS (General Packet Radio System), 2.5G and 3G systems such as UMTS (Universal Mobile Telecommunication Service) systems, Internet Protocol (IP) Wireless Wide Area Networks like 802.16, or 802.20, integrated digital enhanced networks, quadrature amplitude modulation systems (Quad QAM), unit-to-unit communications systems, and variants or evolutions thereof. Furthermore the wireless communication units or devices of interest may have short range wireless communications capability. For relatively small service areas, low power radios can advantageously be used, whereas for large areas, cellular radio technology can advantageously be used.

Furthermore, one or more aspects of the present invention can provide for tracking a mobile object, and can control an environment of the mobile object utilizing a resource management system. In exemplary embodiments and alternative exemplary embodiments, for example, a golf course may have a resource management system such as an irrigation system and a conventional vehicle tracking system, e.g., utilizing a capability of locating the mobile object, e.g., via GPS.

Figure 2:
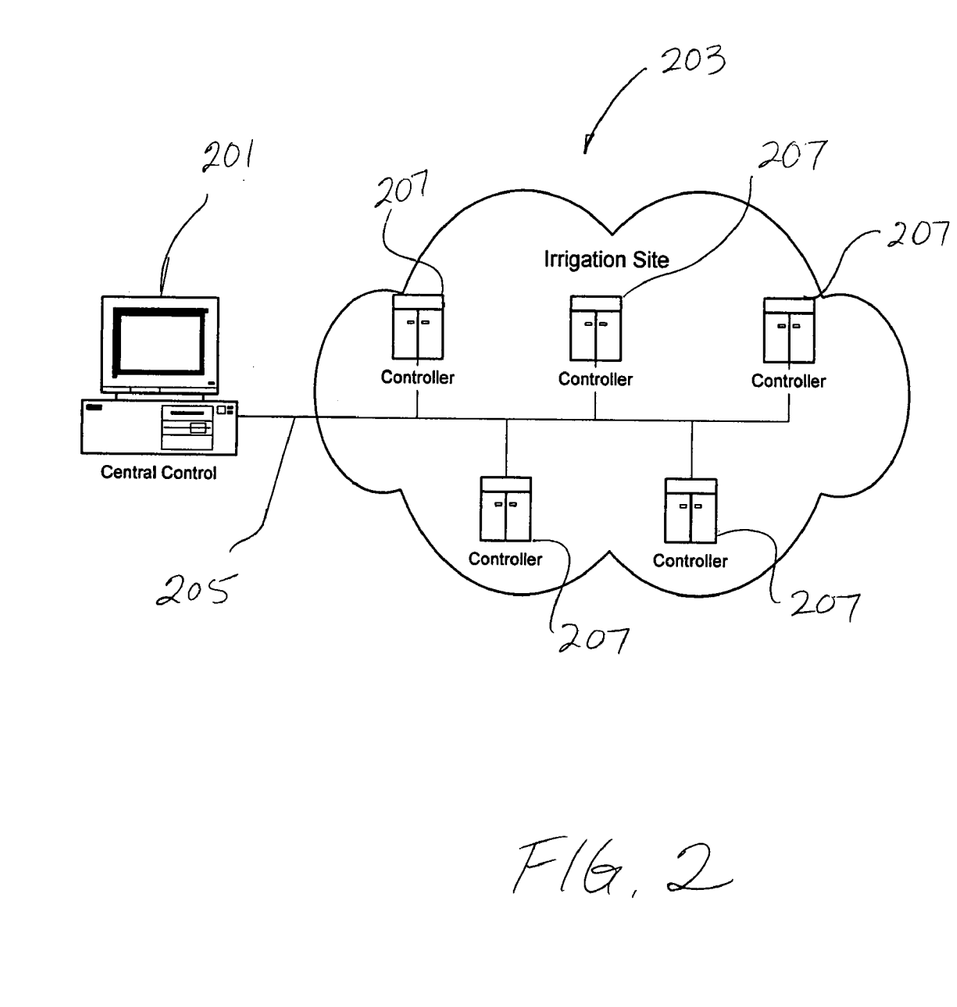
FIG. 2 is a block diagram of an example of a central control irrigation system, in accordance with one or more embodiments.

Reference is now made to FIG. 2, illustrating an irrigation system in simplified form. The irrigation system architecture 203 used to control large sites, such as golf courses, is typically implemented in accordance with one or more embodiments as a central controller 201 controlling field satellites that perform the irrigation. Individual irrigation controllers 207, each of which can be set up to control typically between eight and one hundred individual valves, can be distributed on the irrigation site as required. After their locations are chosen, a communications system 205 may be installed to allow data communication between the controllers 207 and/or between the controllers 207 and the central controller 201, such as a computer. The communication hardware can be physical wire, data radios, phone modems, cellular radios, etc. It will be appreciated that integrating the communication capability can greatly simplify the maintenance of a large site. The irrigation system architecture can allow the entire site to be monitored and maintained in one or more embodiments from a single location. Providing a system and process whereby the resource management system and the mobile object tracking system work together can significantly enhance the management of the resources.

In one or more exemplary embodiments, as discussed herein, the capability of locating the mobile object can advantageously be implemented utilizing GPS vehicle tracking functionality in connection with an irrigation system. In accordance with alternative exemplary embodiments, other means can be utilized to determine a location of the mobile object, for example, other location sensing systems and devices.

The resource management system such as an irrigation system can incorporate bi-directional communications (such as radio, modem, hard-wired, or as previously discussed), for example on a communication channel, and an optional free data port that can allow peripheral components access to the communication channel.

According to one or more embodiments, the communication channel can incorporate a global positioning system (GPS) radio subsystem, including for example client and server spread spectrum radios. Spread spectrum radios can be lower power, license free radios that can use frequency hopping technology to reliably exchange data in a noisy environment. These radios can additionally be programmed to operate on different radio channels, which are effectively different frequency hopping patterns. The different channels allow radio links between separate radio systems to operate within range of one another.

A spread spectrum radio link can include a server radio that broadcasts a periodic message (e.g., a beacon) on a radio channel to which it is assigned. When a client radio on the same channel detects the periodic message, e.g., the beacon, a communication channel can be established between the radios in accordance with known techniques. In accordance with known techniques, two or more client radios can have a link to the same server radio.

The mobile object, such as a vehicle, can incorporate or be attached to a module including a client radio. Field interfaces to the resource management system, for example controllers in the field that are utilized in managing the environmental resources and/or controlling environmental conditions, can advantageously incorporate or utilize server radios.

Multiple server radios can be used to increase a scope of coverage. In accordance with known radio communication techniques, if two or more server radios are within range of each other, they can operate on separate channels so as to maintain distinct communication channels.

Figure 3:
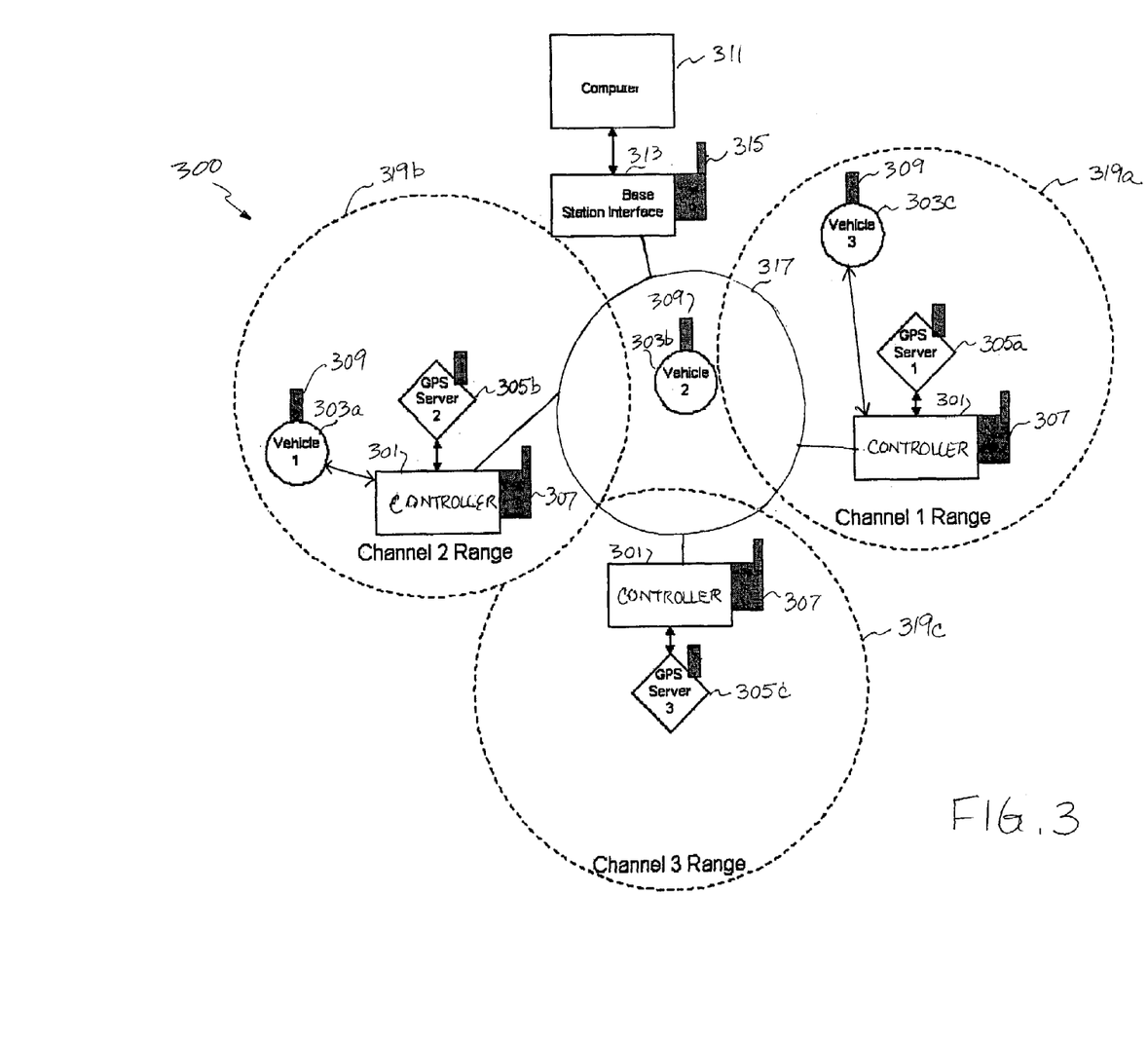
FIG. 3 is a functional block diagram illustrating a simplified network of controllers that can be utilized in connection with mobile objects, for use in accordance with exemplary and alternative exemplary embodiments.

FIG. 3 is a functional block diagram illustrating a system for use in connection with tracking a mobile object and controlling an environment thereof, in accordance with exemplary and alternative exemplary embodiments of the present invention. In overview, FIG. 3 illustrates a resource management system 300 including for the sake of illustration three controllers 301 in connection with field interfaces, in communication via a network 317, for example a peer-to-peer network, and an optional central computer 311 communicating with a base station interface 313, together forming a portion of a resource management system 300. According to exemplary and alternative exemplary embodiments, a base station hosting a base station interface 313 can be a controller. Various mobile objects 303a, 303b, 303c, e.g., vehicles, move in and through the resource that is being managed.

Communication between the mobile objects and the resource management system can be provided, for example by providing a module with a communication device such as a client radio 309 with the mobile object, and by providing a controller with an appropriate communication device such as a server radio 307 on a field interface. A communication device 315 can be added to the optional base station interface 313.

At least a portion of the controllers 301 include a communication device, e.g., server radios 307. A service area in the illustrated example encompasses the ranges 319a, 319b, 319c. The server radios 307 optionally can communicate with a location determination device, for example a GPS server 305a, 305b, 305c, to obtain a location of the mobile objects.

Various controllers 301 with server radios 307 can be deployed in the site of the resource management system as desired, for example, and/or server radios 307 can be deployed on controllers 301 in the field that is supported by the resource management system, so as to provide a service area 300 that generally encompasses the various ranges 319a, 319b, 319c.

According to exemplary and alternative exemplary embodiments, the range of a server radio 307 can be increased beyond the boundaries of the ranges by utilizing a field repeater in accordance with known techniques to add coverage. In the illustrated embodiment, vehicle two 303b is in an area that is not covered by one of the ranges; a repeater or other method/device for extending a range of communication can be added, e.g., in an appropriate location, if desired to maintain coverage.

A controller 301 with a server radio 307 can be configured to allow data, e.g., GPS data, to pass between the radio, e.g., the GPS radio 305a, 305b, 305c, and the communication link 317. According to exemplary and alternative exemplary embodiments, the server radios 307 can run on unique channels, although the server radios 307 can function adequately on identical channels where coverage areas do not intersect. In the illustrated embodiment, for example, the ranges of server radios 307 of the channel 1 319a and channel 2 319b do not overlap, therefore they could be programmed to the same channel without interfering. On the other hand, in the illustrated embodiment, the ranges of server radios 307 of channel 1 319a and channel 3 319c overlap. In this situation, according to exemplary embodiments, the server radios having ranges that overlap can run on separate radio channels (e.g., channel 1 and channel 3); the server radios with overlapping ranges can optionally be programmed in accordance with known techniques to synchronize with the other channel(s).

Modules provided for the mobile objects can include a list of server channels previously determined to be available within the particular resource management system. In the present illustrated example, the list would include channels 1, 2 and 3.

As the mobile object, e.g., a vehicle, moves throughout the service area, a module on the mobile object with the client radio can detect and/or determine whether the module (and therefore the mobile object) is in range of a particular controller. For example, the module of the mobile object can monitor the status of the radio link; if the link is dropped, the module can switch channels in the list until a link to the controller is re-established. According to alternative exemplary embodiments, once a valid link to a server is present, the link from the module to the optional central computer 311 can be implied, where the controllers 301 are linked to the central computer 311 via the communication network 317.

One or more embodiments provide that at least a portion of the system and software can be distributed to the optional central computer 311 used for the resource management system, for example, irrigation control.

Figure 4:
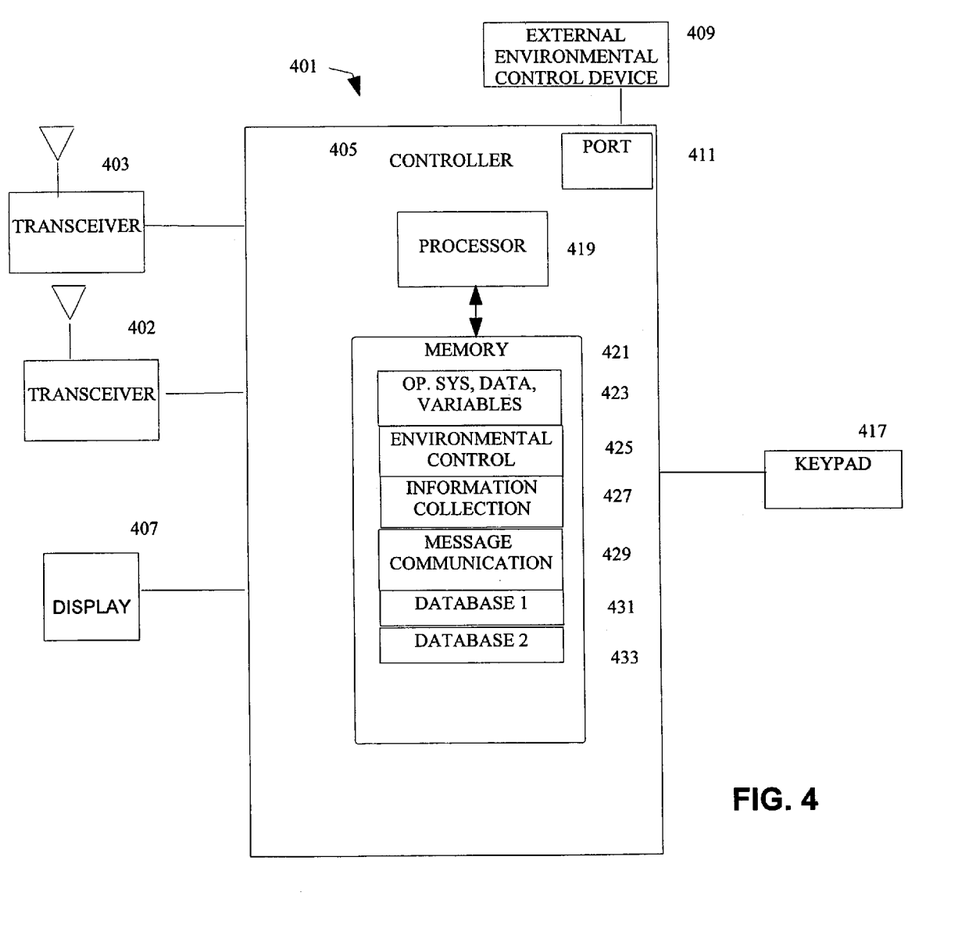
FIG. 4 is a block diagram illustrating portions of an exemplary controller, in accordance with various exemplary and alternative exemplary embodiments.

FIG. 4 is a block diagram illustrating portions of an exemplary control unit for use in accordance with various exemplary and alternative exemplary embodiments. This exemplary controller can advantageously be implemented on or used in connection with, e.g., a field interface 401 discussed in connection with FIG. 3 above, for example, an irrigation controller. The field interface 401 may incorporate a controller 405, and may include a first transceiver 402, a second transceiver 403, an optional display 407, an optional communication port 411 for communication with an external environmental control device 409, a processor 419, a memory 421, and/or an optional user input device such as a keypad 417.

The first transceiver 402 may be adapted to communicate with a communication device of the module on the mobile object. In accordance with one or more embodiments, the communication device on the mobile object can have a short-range transmitter and/or receiver. The second transceiver 403 may be adapted to communicate with other controllers at field interfaces and/or a controller at a base station.

The processor 419 may comprise one or more microprocessors and/or one or more digital signal processors. The memory 421 may be coupled to the processor 419 and may comprise a read-only memory (ROM), a random-access memory (RAM), a programmable ROM (PROM), and/or an electrically erasable read-only memory (EEPROM). The memory 421 may include multiple memory locations for storing, inter alia, an operating system, data and variables 423 for programs executed by the processor 419; computer programs for causing the processor to operate in connection with various functions such as controlling an environmental condition 425, collecting information 427, communication of messages 429, and/or other processing (not illustrated); a database 1 431 of various other data, e.g., tables used for determining commands and temporarily storing environmental and/or mobile object history data; and/or a database 433 for other information used by the processor 419. The computer programs may be stored, for example, in ROM or PROM and may direct the processor 419 in controlling the operation of the field interface 401.

According to one or more exemplary and alternative embodiments, the processor 419 may be programmed to interact with the user, for example as described above. The user may input information and can invoke functions accessible through the optional user input device 417. The optional user input device 417 may comprise one or more of various known input devices, such as a keypad, a computer mouse, a touchpad, a touch screen, a trackball, and/or a keyboard. The optional image display 407 may present, for example, messages or other information to the user by way of a conventional liquid crystal display (LCD) or other visual display.

The environmental control device 409 can be, for example one or more devices intended to affect the environment at the field interface. For example, where the resource being managed includes a turf, the environmental control device can be a valve for a sprinkler, in order to control irrigation and/or fertigation. As another example, where the resource includes salt and/or sand, the environmental control device can be one or more of the salt and/or sand sprayers/spreaders, brine solution dispensers, and temperature and/or freeze detect sensors in, e.g., a roadway.

Figure 5:
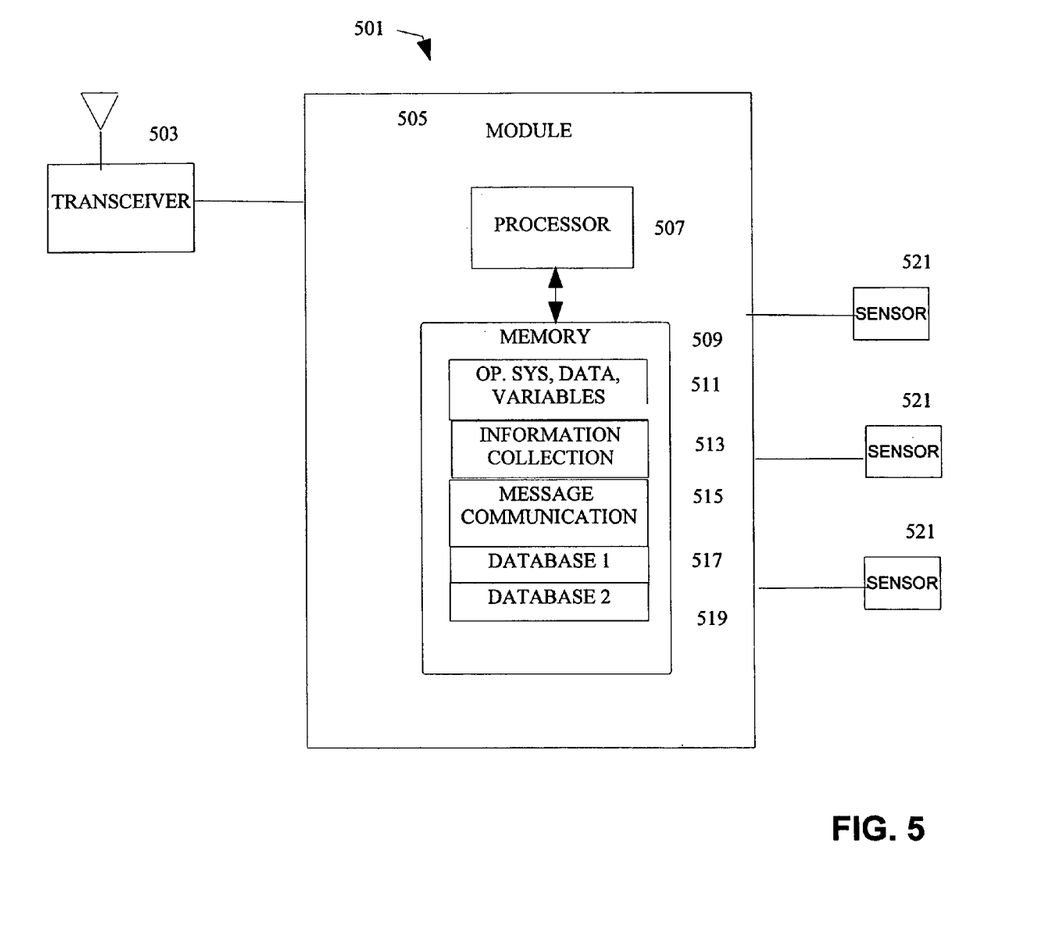
FIG. 5 is a block diagram illustrating portions of an exemplary module, for use in operation of exemplary and alternative exemplary embodiments.

FIG. 5 is a block diagram illustrating portions of an exemplary module for a mobile object 501 for use in accordance with various exemplary and alternative exemplary embodiments. The mobile object 501 may incorporate, be connected to, or otherwise include a module 505, a transceiver 503, a processor 507, a memory 509, and one or more sensors 521.

The transceiver 503 may be adapted to communicate with a communication device on the controller(s) at field interfaces. In accordance with one or more embodiments, the transceiver 503 on the mobile object 501 can be a short-range transmitter and/or receiver. The processor 507 may comprise one or more microprocessors and/or one or more digital signal processors. The memory 509 may be coupled to the processor 507 and may comprise a read-only memory (ROM), a random-access memory (RAM), a programmable ROM (PROM), and/or an electrically erasable read-only memory (EEPROM). The memory 509 may include multiple memory locations for storing, inter alia, an operating system, data and variables 511 for programs executed by the processor 507; computer programs for causing the processor to operate in connection with various functions such as collecting information 513, e.g., from sensors 521, communication of messages 515, and/or other processing (not illustrated); a database 1 517 of various other data, e.g., tables used for determining commands and temporarily storing mobile object data in a history; and/or a database 519 for other information used by the processor 507. The computer programs may be stored, for example, in ROM or PROM and may direct the processor 507 in controlling the operation of the mobile object 501.

The sensors 521 can be distributed in or throughout the mobile object, in order to detect, sense or otherwise collect various information regarding a condition and/or status of the mobile object. The type of sensors and the data collected can vary as desired, and can be provided in connection with known techniques.

In accordance with one or more embodiments, operation of the mobile object can be controlled, responsive to commands received from the communication interface. Where the mobile object includes equipment to affect the environmental conditions (e.g., the mobile object is a vehicle equipped with a mower), for example, the equipment can be controlled to be on or off or at certain levels in response to such commands. As another example, the mobile object itself can be powered off and/or on, in response to such a command.

Figure 6:
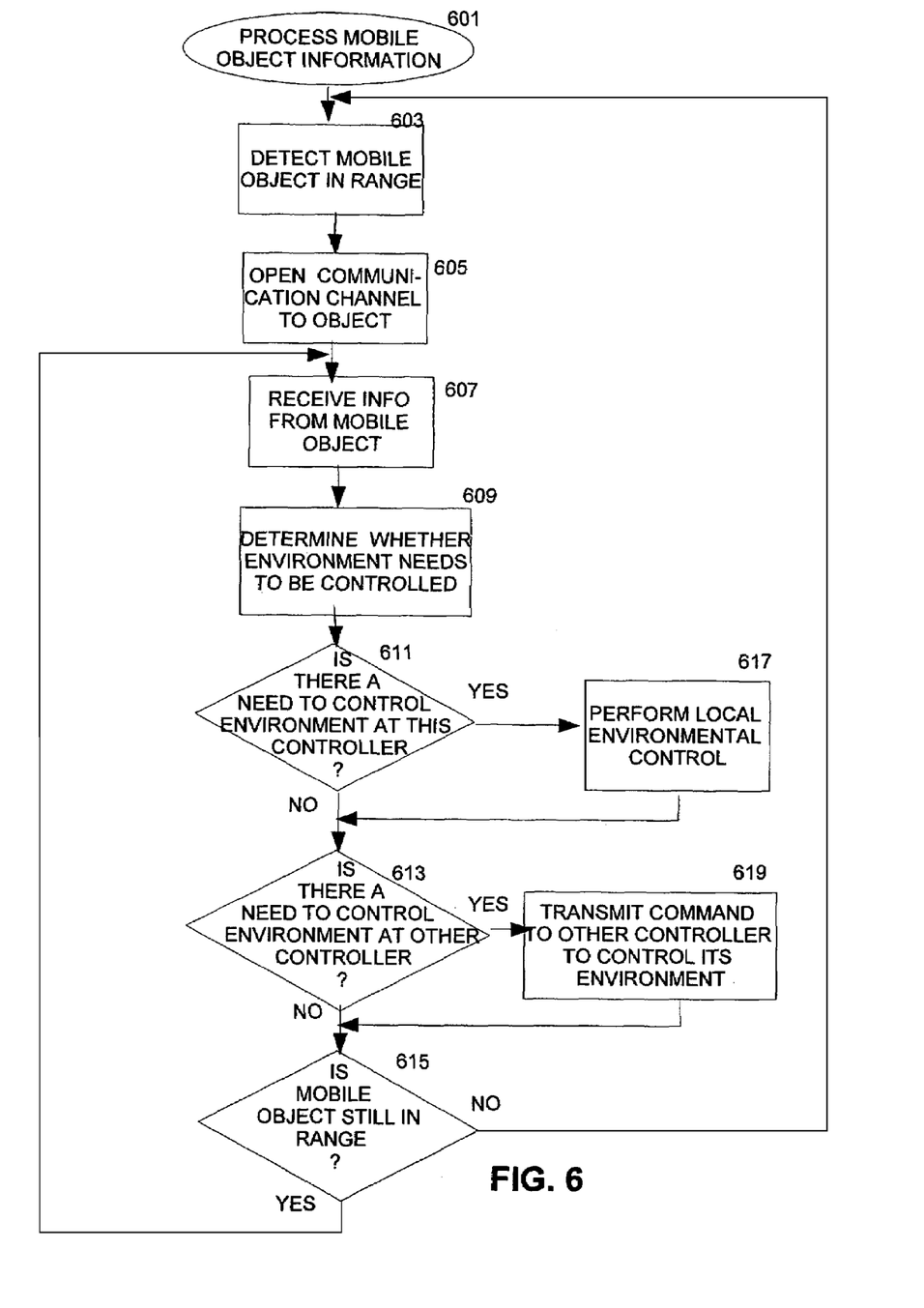
FIG. 6 is a flow chart illustrating an example process for processing mobile object information, in accordance with various exemplary and alternative exemplary embodiments.

FIG. 6 is a flow chart illustrating an example process for processing mobile object information, in accordance with various exemplary and alternative exemplary embodiments. In accordance with one or more exemplary and alternative exemplary embodiments, the process can be advantageously implemented on one or more devices that comprise a portion of the resource management system, for example the controller of the field interface, as illustrated for example in connection with FIG. 4. The process provides for detecting the mobile object when in range 603, as described for example above. When the mobile object is detected in range, the process provides for opening a communication channel to the mobile object 605, as previously described herein. When the communication channel is open, the processor provides for receiving information from the mobile object 607, for example via the server radio.

Advantageously, information from the mobile object can be transmitted in a communication packet. The information transmitted can include, for example, an identity of the mobile object, a location of the mobile object, and other sensed information from the mobile object, for example, speed, distance traveled since last update, and other sensed data. Some or all of the information transmitted from the mobile object can be stored, for example, to provide for tracking of the mobile object.

At 609, the process determines whether the environment managed by the resource management system should be controlled. For example, if the environment in the location of the controller may affect the mobile object, the environment can be controlled. As a more specific example, consider that the resource being managed is a turf under irrigation control; if the location of the field under control of the controller or other controllers in the vicinity is presently being irrigated, one or more controllers can temporarily suspend irrigation, optionally accommodating the suspended activity in the usual resource management program.

At 611, the process determines whether there is a need to control the environment at the present controller. For example, where the mobile object is traveling through an area presently under irrigation, irrigation at the controller can be suspended by performing the usual actions to stop irrigating, 617.

At 613, the process determines whether there is a need to control the environment at another controller. According to exemplary and alternative exemplary embodiments, it may be desirable to control the environment if a controllable condition in the environment will have an undesired effect upon the mobile object. As a specific example, where the mobile object is a vehicle with a passenger that will be traveling through an area presently under irrigation at another controller, irrigation at the other controller can be suspended by transmitting an appropriate command to the other controller, thereby causing the other controller to stop irrigating, 619. The predicted path of the mobile object can be determined, for example, according to known techniques, and it can then be determined when a predicted location of the mobile object will be proximate to one of the other controllers. Commands to the other controller for controlling irrigation could include, for example, adjust irrigation operation, review irrigation operation, review environment sensors, review irrigation schedule, initiate watering, and disable watering.

At 615, where the mobile object is still in range, the process can loop back to continue to receive information from the mobile object 607. On the other hand, if the mobile object has moved out of range, the process can loop back to await a detection of a mobile object within range of the controller 603.

Figure 7:
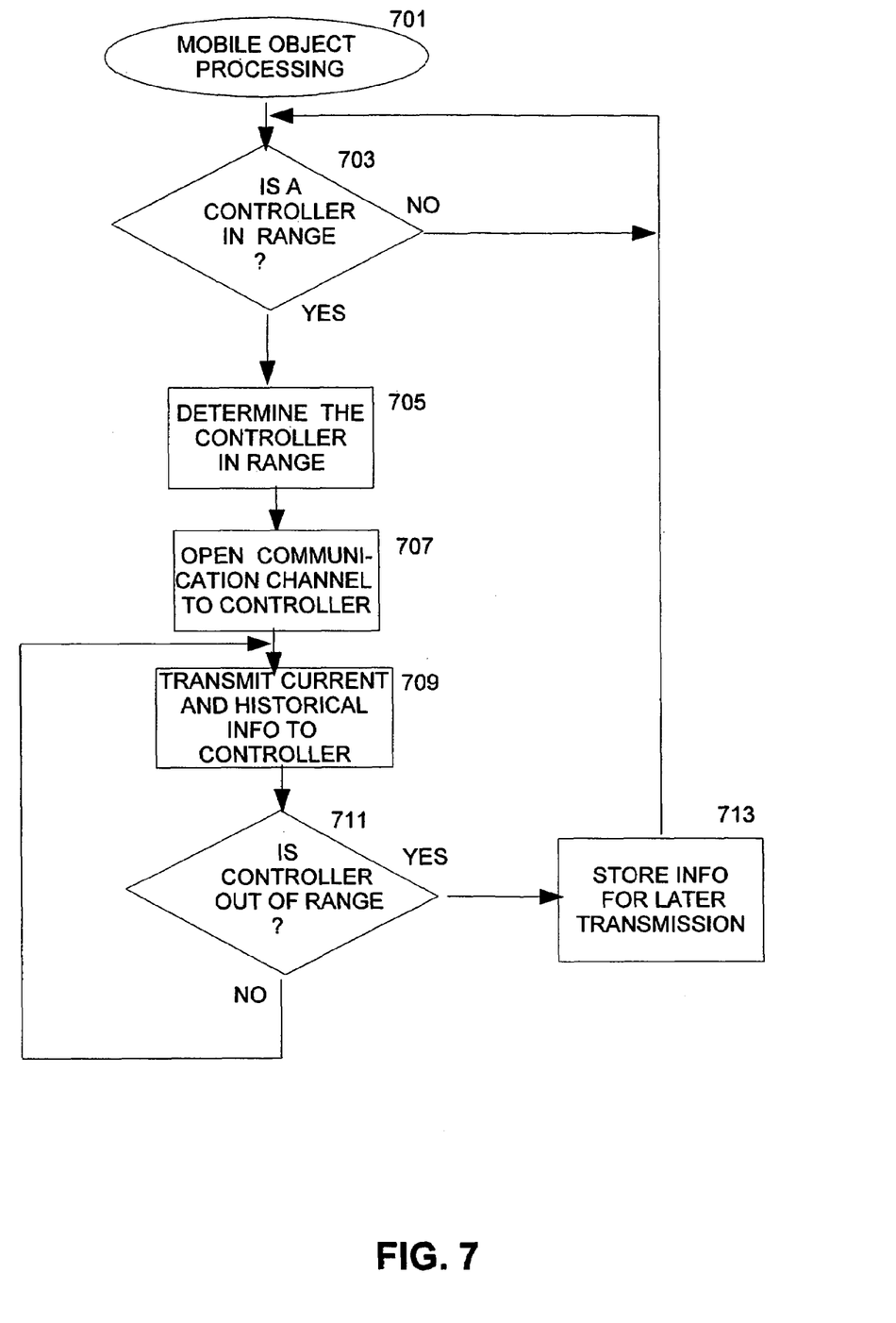
FIG. 7 is a flow chart illustrating an example of processing by the module, in accordance with various exemplary and alternative exemplary embodiments.

FIG. 7 is a flow chart illustrating an example of processing by the mobile object 701, in accordance with various exemplary and alternative exemplary embodiments. In accordance with one or more exemplary and alternative exemplary embodiments, the process can be advantageously implemented on a device that is connected to or comprises a portion of the mobile object, for example the module illustrated in connection with FIG. 5. At 703, the process determines whether a controller is in range. If there is no controller in range, the process loops. If a controller is detected in range, the process determines what controller is in range 705, according to one or more embodiments, in order to open an appropriate communication channel 707. At 709, the process obtains current and historical information regarding the mobile object, and transmits the current and historical information (if any) via the communication channel to the controller. The process continues to transmit current and historical information 709, while the controller is in range 711. If the controller is out of range 711, the process stores the information as historical information for later transmission 713. In this way, advantageously, a mobile object can travel out of range of the controllers in the field and can still have the opportunity to forward a complete set of information regarding, for example, a sensed status of the mobile object.

Figure 8:
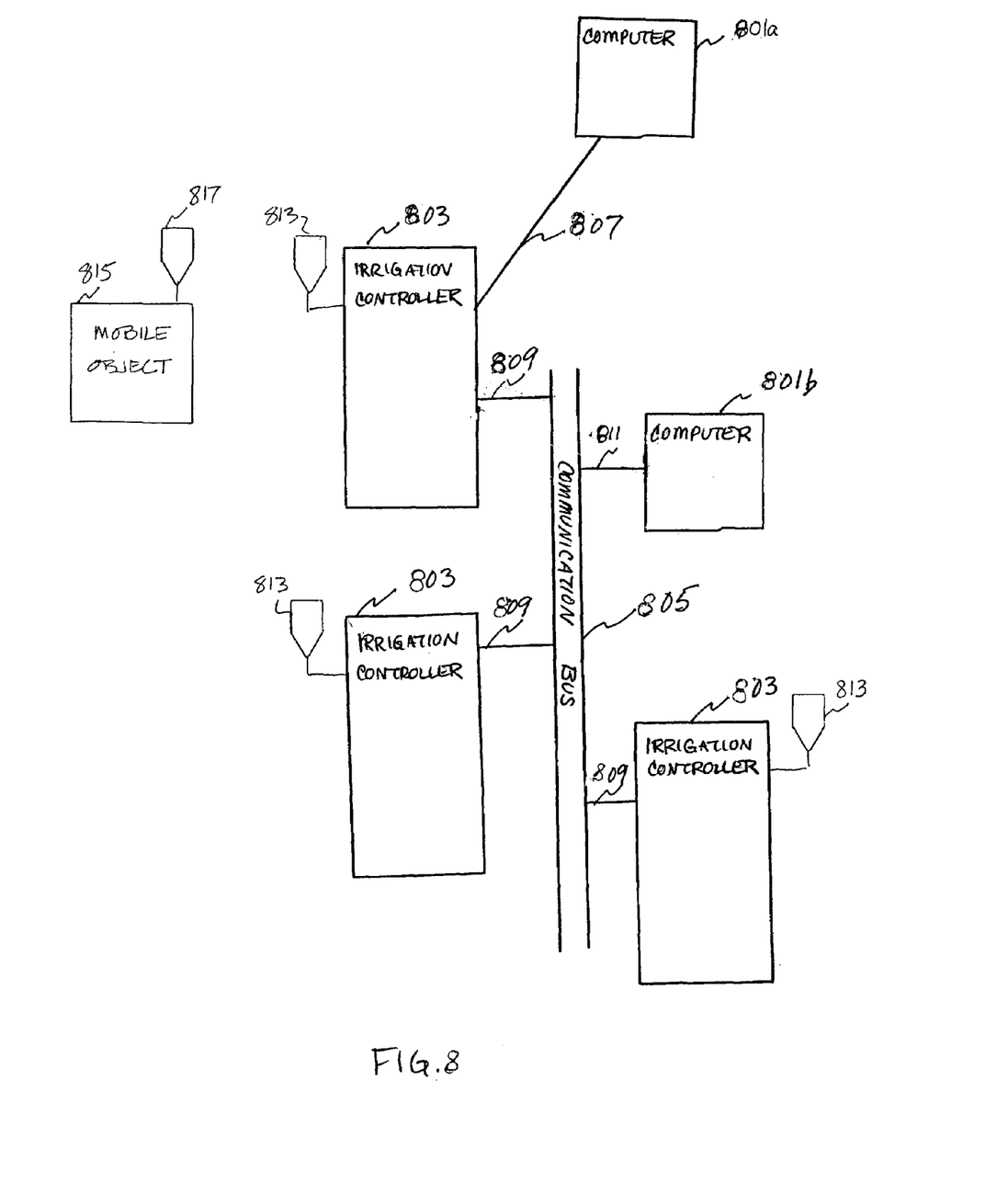
FIG. 8 is a block diagram illustrating a simplified network for use in connection with one or more exemplary and alternative exemplary embodiments.

FIG. 8 is a block diagram illustrating a network for use in connection with one or more exemplary and alternative exemplary embodiments. This figure illustrates a simplified example network for use in connection with a resource management system comprising irrigation controllers. As illustrated, an irrigation controller system may include several irrigation controllers 803, transmitting and receiving data 809 to each other via a communication bus 805. According to one or more embodiments, the irrigation controllers are advantageously embodied in a peer-to-peer network. Optionally, a computer 801*a* may communicate 807 with one or more of the irrigation controllers 803; or a computer 801*b* may communicate 811 directly with the irrigation controllers 803 via the communication bus 805. Information can be communicated from the transceiver 817 of the mobile objects 815 and collected by the controllers 803 via the transceiver 813. According to one or more exemplary and alternative exemplary embodiments, the collected information further can be provided to the computer 801*a* communicating via the communication bus 805 from controllers 803. Moreover, one or more computers 801*a*, 801*b* optionally can provide control over the controllers 803, for example, download particular programs. In operation, the network of controllers may include more or fewer controllers, and may omit the computers.

Figure 9:
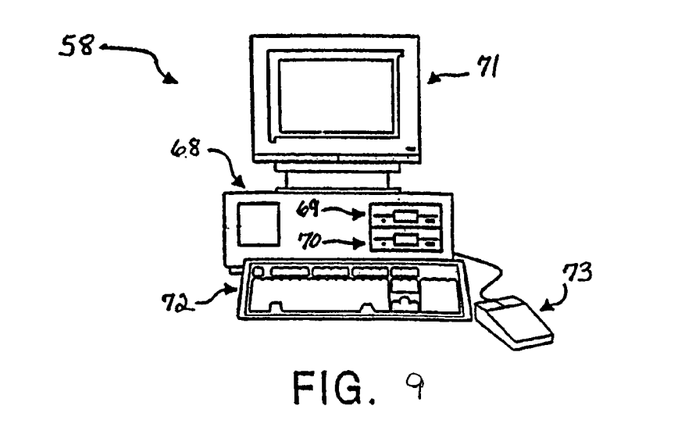
FIG. 9 shows a block diagram of a computer, suitable for use in connection with carrying out one or more embodiments of the present invention.

FIG. 9 shows a block diagram of a computer, suitable for use in connection with carrying out one or more embodiments of the present invention. Viewed externally in FIG. 9, computer 58 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Figure 10:
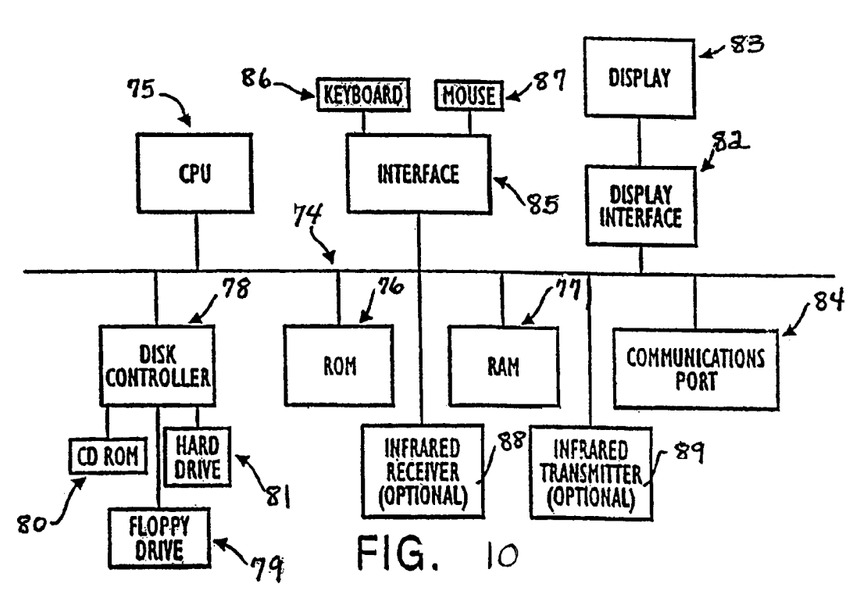
FIG. 10 illustrates a block diagram of the internal hardware of the computer of FIG. 9.

FIG. 10 illustrates a block diagram of the internal hardware of the computer of FIG. 9. CPU 75 is the central processing unit of the system, performing calculations and logic operations required to execute a program. Read only memory (ROM) 76 and random access memory (RAM) 77 constitute the main memory of the computer. Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices can occur using communications port 84.

In addition to the standard components of the computer, the computer may also include an interface 85, which allows for data input through the keyboard 86 or pointing device, such as a mouse 87.

The processing described herein could be controlled by a software program, or could even be partially or wholly implemented in hardware. The system used in connection with the invention may rely on the integration of various components, as appropriate and/or if desired.

It should be understood that the invention is described in connection with logical groupings of functions or resources. One or more of these logical groupings may be omitted from one or more embodiments, and still remain within the scope of the present invention. Likewise, functions may be grouped differently, combined, or augmented without departing from the scope of the invention. Similarly the present description may describe various databases or collections of data and information. One or more groupings of the data or information may be omitted, distributed, combined, or augmented, or provided locally and/or remotely without departing from the scope of the invention.

One or more alternative embodiments of the present invention may be used in connection with a computer communicating via the network, although use of the computer is not necessary for other embodiments.

Further, this invention has been discussed in certain examples as if it is made available to a single mobile object. The invention may be utilized in connection with numerous mobile objects, if preferred. The system used in connection with the invention may rely on the integration of various components including, as appropriate and/or if desired, hardware and software servers, database engines, and/or other content providers.

The system according to one or more embodiments of the invention is optionally suitably equipped with a multitude or combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on floppy disk, provided on CD ROM, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used.

As another example, the system may be a general purpose computer, or a specially programmed special purpose computer. It may also be implemented to include a distributed computer system rather than as a single computer; some of the distributed system might include embedded systems. Similarly, the processing could be controlled by a software program on one or more computer systems or processors, or could be partially or wholly implemented in hardware.

The system used in connection with the invention may rely on the integration of various components including, as appropriate and/or if desired, hardware and software servers, database engines, and/or other resource management system components. The configuration may be, alternatively, network-based and may, if desired, use the Internet to communicate between controllers and/or the optional central computer.

One or more embodiments can include a process and/or steps. Where steps are indicated, they may be performed in any order, unless expressly and necessarily limited to a particular order. Steps that are not so limited may be performed in any order.

What is claimed is:

1. A controller for determining a location of a mobile object and controlling an environment of the mobile object, comprising:
   (A) a processor, wherein the processor is configured to facilitate communicating via a first transceiver and a second transceiver; to facilitate receiving, from a mobile object via the first transceiver, a communication including information representative of the mobile object; to facilitate transmitting, responsive to the communication, a first command to an other controller via the second transceiver; to facilitate receiving a second command via the second transceiver from the other controller; and to facilitate controlling irrigation or fertigation outside of the mobile object responsive to at least one of the second command and the communication.

2. The controller of claim 1, further comprising:
   (B) a first transceiver, to receive communications transmitted from the mobile object; and
   (C) a second transceiver, to transmit and receive commands.

3. The controller of claim 1, wherein the processor is configured to facilitate opening at least one communication channel to at least one other controller, and to facilitate transmitting the first command to the at least one other controller on the communication channel.

4. The controller of claim 1, wherein the processor is configured to facilitate providing at least one communication channel from the first transceiver to a radio on the mobile object, and to facilitate receiving the communication on the communication channel.

5. The controller of claim 1, wherein the first command is initiated at the controller and indicates a location of the mobile object, a history of the mobile object, and an identity of the mobile object.

6. The controller of claim 5, wherein the mobile object is a vehicle, and wherein the history indicates information sensed regarding the status of the vehicle.

7. The controller of claim 1, further comprising a memory, configured to store information representative of an environment at a location of the first transceiver, wherein the processor is further configured to facilitate determining whether or not to control the environment exterior of the vehicle responsive to the information representative of the environment at the location of the first transceiver.

8. The controller of claim 1, wherein the processor is further configured to facilitate communicating as part of a distributed network system.

9. The controller of claim 8, wherein the distributed network system is a peer-to-peer network.

10. The controller of claim 1, wherein the processor is further configured to facilitate at least one of determining and predicting a location of the mobile object, and to facilitate transmitting the first command to the other controller when a location of the mobile object will be proximate to the other controller.

11. The controller of claim 1, wherein the second command is at least one of: adjust irrigation operation, review irrigation operation, review environment sensors, review irrigation schedule, initiate watering, and disable watering.

12. The controller of claim 1, wherein the processor is further configured to facilitate transmitting a third command to the mobile object to control an operation of the mobile object.

13. The control let of claim 1, wherein the processor is further configured to facilitate controlling salt distribution, sand distribution, brine dispensation, or mowing at the mobile object.

14. A controller for use in connection with determining a location of a mobile object, and controlling an environment of the mobile object, comprising:
  (A) a global positioning system (GPS), for sensing a location of the mobile object;
  (B) a processor, connected to the GPS, wherein the processor is configured to facilitate communicating via a transceiver; to facilitate collecting information representative of the mobile object including at least the location; to facilitate transmitting, to a controller via the transceiver, a communication including the information representative of the mobile object; to facilitate receiving a command via the transceiver from the controller; and to facilitate controlling an operation of the mobile object responsive to the command,
    wherein the controlled operation of the mobile object is salt distribution, sand distribution, brine dispensing, or mowing.

15. The controller of claim 14, wherein the controller is utilized in the mobile object.

16. The controller of claim 14, further comprising a first transceiver, wherein the processor is configured to facilitate opening at least one communication channel to the other controller, and to facilitate communicating with the controller on the communication channel.

17. The controller of claim 16, wherein the at least one communication channel is a short wave radio channel.

18. The controller of claim 14, wherein the information further includes a history of the mobile object from information sensed by the mobile object regarding a status of the mobile object, and an identity of the mobile object.

19. The controller of claim 14, wherein the mobile object is a vehicle, and wherein the history indicates information sensed regarding the status of the vehicle.

20. The controller of claim 14, wherein the processor is further configured to facilitate storing the collected information when outside of a communication range with the controller, and transmitting the stored information to the controller when the mobile object is within the communication range.

21. The controller of claim 14, wherein the processor is further configured to facilitate communicating with the controller via the transceiver to cause the controller to change irrigation or fertigation control when the mobile object travels through an area of irrigation or fertigation under control of the controller.

22. A method for controlling an environment condition at a location of a mobile object in connection with a peer-to-peer distributed network system, where the distributed network includes a plurality of controllers, comprising the at least one of sequential, non-sequential, and sequence-independent steps of:
  (A) sensing, in at least one controller of a plurality of controllers, a location of the mobile object;
  (B) receiving, from the mobile object, information representative of a condition of the mobile object;
  (C) transmitting, responsive to the received information, the information to at least one other controller;
  (D) controlling, responsive to the received information, in the at least one controller, an environmental condition of the mobile object, wherein the environmental condition is an irrigation condition or a fertigation condition.

* * * * *